Figure 4:
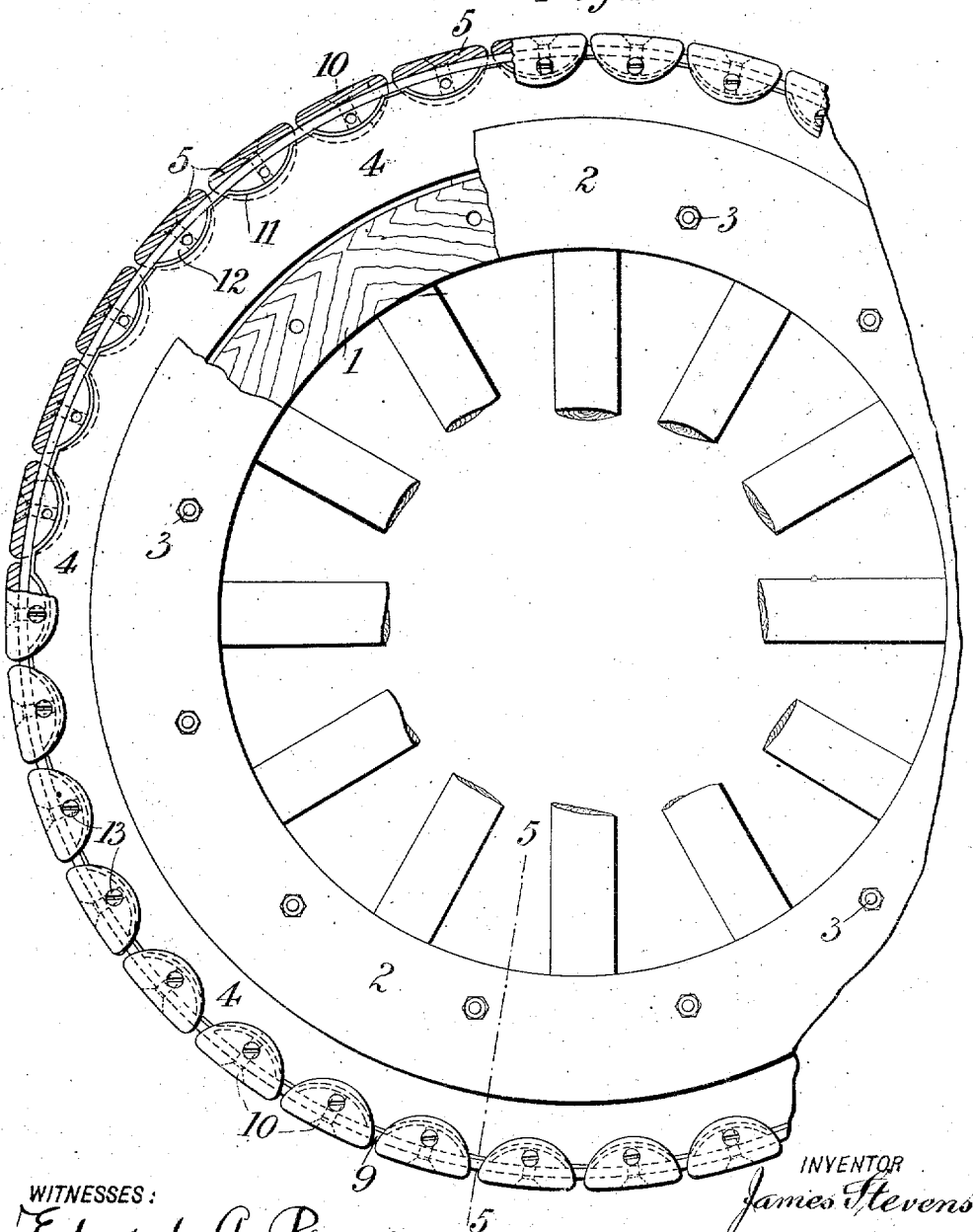

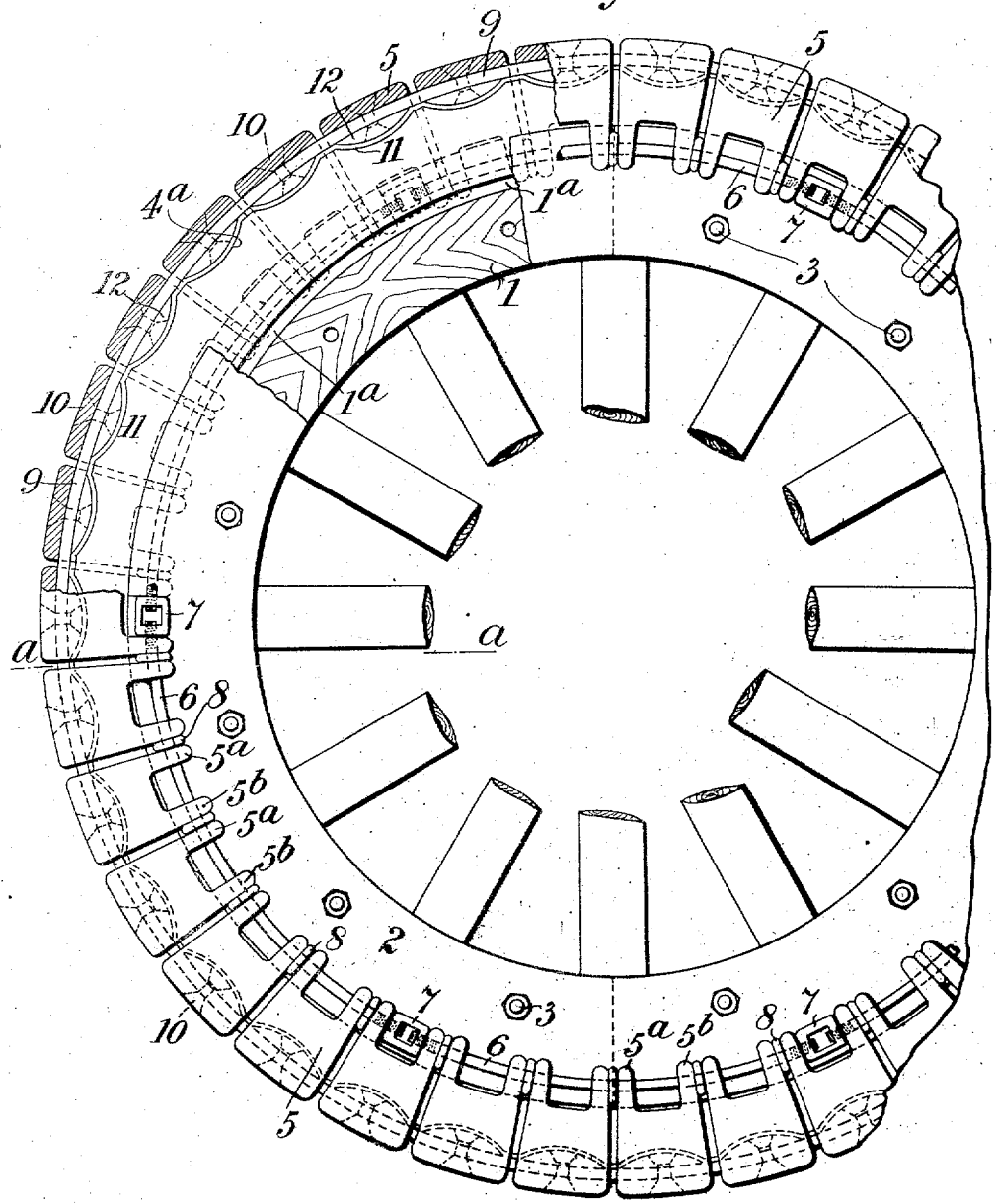

No. 888,269.
PATENTED MAY 19, 1908.
J. STEVENS.
CUSHION TIRE FOR ROAD VEHICLE WHEELS.
APPLICATION FILED MAR. 26, 1906.
3 SHEETS—SHEET 2.
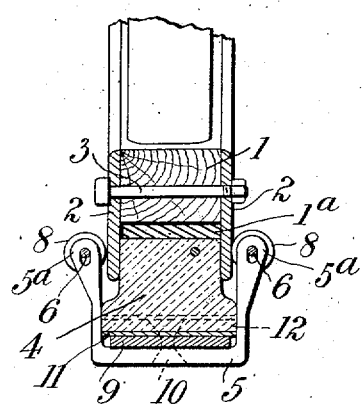
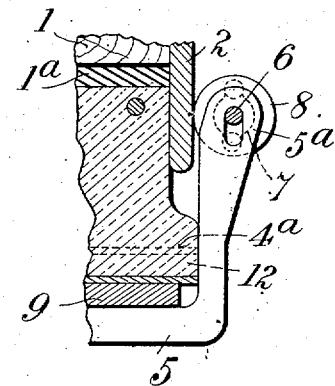
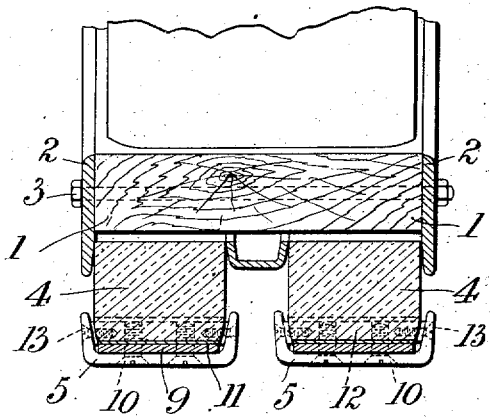
WITNESSES:
INVENTOR
James Stevens
BY
ATTORNEYS.

UNITED STATES PATENT OFFICE.

JAMES STEVENS, OF LONDON, ENGLAND.

CUSHION-TIRE FOR ROAD-VEHICLE WHEELS.

No. 888,269.　　　Specification of Letters Patent.　　　Patented May 19, 1908.

Application filed March 26, 1906. Serial No. 307,963.

*To all whom it may concern:*

Be it known that I, JAMES STEVENS, consulting engineer, a subject of the King of Great Britain, residing at 9 Fenchurch avenue, in the city of London, England, have invented certain new and useful Improvements in or Relating to Cushion-Tires for the Wheels of Road-Vehicles, of which the following is a specification.

This invention relates to resilient or cushion tires for the wheels of road vehicles and is designed to protect the rubber or other resilient material of which such cushion tires are composed by providing a series of metal shoes or sections forming a metal running surface or tread constructed, arranged and mounted in a novel manner.

I am aware that heretofore it has been proposed to employ on the rim of the wheel an endless band of rubber and over the latter an endless metal band or metal ring (forming a metal sheath) inclosing between it and the metal rim the rubber ring—this arrangement being designed to obtain the resilient or cushioning action of the rubber without the rubber making contact with the road. Also I am aware that a similar arrangement has been proposed in which the exterior metal sheath forming the outer tread is formed in sections and each such section bolted separately to the felly of the wheel and fitting within the flanges of a U-shaped channel, and each section having a series of inwardly opening pockets formed on the inside face thereof, to receive separate cushions of rubber or metal springs in said pockets all round the periphery such separate cushions being used instead of a continuous band of rubber (or rubber ring) all round as previously suggested. I am also aware that it has been proposed to protect rubber tires by the use of metal shoes of channel shape, such shoes being pivoted to the rim flanges or felly of the wheel.

I do not use any of the foregoing arrangements but according to my present invention I proceed as follows:—The felly of the wheel is provided with a channeled rim advantageously of U-shape in cross-section (or two or more such channels may be employed for forming a twin tire or plural track tire) for holding therein the elastic cushion of rubber or the like; and the sides or flanges of such rims are advantageously formed at right angles to the bottom of said rim, and are advantageously flat on the outer side or otherwise suitably formed; and I provide a protecting covering for the said elastic cushion comprising a series of channel-shaped sections advantageously ⊔-shaped sections of steel or iron or other suitable metal (which I shall hereinafter refer to as the "shoes") which are specially mounted in inverted position over the aforesaid elastic cushion and secured in accordance with this invention as hereinafter explained. A protecting covering is thus provided (for the elastic cushion) which forms the actual wearing surface for contact with the ground; and the shoes are each secured and mounted in position over and so as to inclose the elastic cushion or cushions (advantageously an endless band of rubber) around the periphery of the wheel as follows: The cushion of rubber or other resilient material is mounted and secured on or in or to the rim in any well-known or suitable manner (for example in any of the well-known manners at present employed and suitable for my purpose) and the side flanges of the shoe sections may be of such depth as not to overlap the rim flanges—but nevertheless of such size as to sufficiently embrace and inclose the cushion of rubber etc. to protect same.

The edges of the shoe sections may be so formed as to receive therein or to have attached thereto a flexible tie or ties such as a metal rod or wire rope or the like which is firmly secured on each side to or through each of the shoe sections all round the wheel and the ends of said flexible tie or ties are then secured together by any suitable means advantageously a tightening arrangement in each shoe (so as to enable same to be tightened up to any desired extent) and thereby form practically an endless ring on each side. Means may also be provided if desired to attach said flexible metal tie or ties at one or more points to the rim or web of the wheel. Furthermore I employ a flexible band, for example, a flat wire rope or metal band or the like all round the periphery of the cushion (of rubber, etc.) and between the latter and the metal shoes so as to protect the rubber, etc., at the intervals between the adjoining ends of the shoe sections. The said shoes are riveted or otherwise connected to the flexible band in suchwise as to prevent circumferential movement of the shoes relative to each other and to the flexible band. Furthermore I advantageously employ any suitable means in order to prevent creeping of the ring of shoe sections with respect to the rubber and for this purpose I may advantageously adopt the following:—The cushion of rubber, etc., on its outer periphery may be provided with a series of concavities or other depressions either arranged equally all round such periphery or at any suitable point or points thereon adapted to receive insertion pieces of any suitable material advantageously formed on the underside as a counterpart of said concavity or depression in the rubber and these insertion pieces are located between said parts of the periphery of the rubber cushion and the flat wire rope between the cushion periphery and the shoes, or if such wire rope is not used then these insertion pieces may be laid between the rubber cushion and the inside of the tread of the shoe sections direct; the said insertion pieces being secured to the wire rope or to the shoe sections or both by any suitable means. Thus independent movement is permitted to each metal shoe as same makes contact with the ground while all are firmly and safely secured together in position over the cushion of rubber, etc.

In the accompanying drawings:—Figure 1 is a view in elevation of a wheel fitted with a tire protector or shield according to this invention with part of the wheel flange and several flanges of the shoe sections removed to show the interior arrangements. Fig. 2 is a transverse section on the line a—a Fig. 1. Fig. 3 is a local transverse section on an enlarged scale—on the line a—a Fig. 1. Figs. 4 and 5 show a modification wherein the invention is carried out without the employment of any metal rod or tie 6 on the inner edges of the flanges of the shoes 5 nearest to the center of the wheel; Fig. 4 being a similar view to Fig. 1 in side elevation with part of the rim flange broken away and also the side flanges of some of the shoes broken away showing this modification on a twin track wheel Fig. 5 being a local cross-sectional view on line 5—5 Fig. 4.

Referring now more particularly to Figs. 1 to 3:—1 represents the felly of the wheel and 2 2 are circular metallic flanges which are secured to the sides of the felly 1 by the bolts and nuts 3 3 or by any other suitable means. The diameter of the said flanges 2 2 is made greater than that of the felly 1 to which they are secured—in such manner that the projecting edges of the flanges 2 2 form a channel on the rim of rectangular form (or thereabouts) in cross-section and of any desired depth all round the periphery of the wheel. In the said channel or rim is fitted an elastic cushion 4 (advantageously an endless band of rubber). The outer sides of the flanges 2 2 are flat and reparallel to each other and are adapted to receive thereover a series of U-shaped or ⊔-shaped sections (of metal) 5 5 which I have termed the "shoes" which form the protecting covering for the elastic cushion 4 and also form the actual wearing surface which makes contact with the ground. The said series of shoes 5 are each secured and mounted in position over- and so as to inclose— the said elastic cushion 4 arranged round the periphery of the wheel as follows:—On the edges of the flanges of each shoe section 5 in the direction towards the center of the wheel are formed projections $5^a$ $5^b$ (Fig. 1) in which are provided holes equidistant from the center of the wheel—and running circumferentially there-through. The said holes may be slotted radially as shown in Fig. 3 (to allow for the movements of the shoe sections during the running of the wheel) and are adapted to receive therein a metal tie or ties— for example a metal rod—or a wire rope—6. Each such rod 6 as illustrated passes through the projections $5^a$ $5^b$ of several pairs of shoe sections 5 and the ends of the said rods or ties 6 are then secured (connected) together by any suitable means—for example by a turn-buckle or tightening arrangement 7 (Fig. 1). The turn buckle 7 is arranged to fit in between the projections $5^a$ $5^b$ of any individual shoe section 5 and is provided with right and left handed screw threads, by means of which the aforesaid rods 6 may be tightened up to any desired extent—and thereby form practically a complete ring on each side of the wheel to which each flange of each shoe section is attached and the whole series as a complete ring can be tightened up.

It will be obvious that if desired each metal rod or wire rope 6 may be made longer or shorter so as to extend through a greater or less number of the shoes, or so as to extend all round the wheel with one turn-buckle only; for example (about) six lengths of such wire rope or metal rod 6 with a corresponding number of turn-buckles 7 may be employed on each side after the manner illustrated in Fig. 1.

Washers 8 of any suitable material (advantageously of rubber) may be inserted between each pair of shoe sections to minimize the friction and noise during the running of the wheel—and said washers may conveniently be secured in position by being placed on the rods 6 between the projections $5^a$ $5^b$ of the adjoining shoe sections 5. By the above described arrangement—independent movement is permitted to each metal shoe 5 as same makes contact with the ground; while all are firmly and safely secured together in position over the cushion of rubber etc. by means of the said metal ties or rods 6.

A flat wire rope or band 9 is inserted between the outer periphery of the rubber cushion and the inside of the shoes 5 said flat wire rope 9 being of suitable flexibility; and the ends of same may be spliced or joined in any suitable manner (or the flat wire rope may be manufactured in the form of a complete ring) completely encircling the outer periphery of the rubber cushion 4; and furthermore each metal shoe 5 is attached to this flat wire rope or other metal band 9 by means of rivets 10—or other suitable fastenings, one object of the said flat wire rope or band being to prevent nipping of the rubber cushion 4 between the adjoining ends of the shoes 5 owing to the movement of the latter during the running of the wheel; and furthermore this flat wire rope or band serves to locate and maintain each shoe in its proper relative position.

The shoes may be of any suitable length—for example the shoe sections 5 may each be about three inches in length—and suitably curved so that the tread portion thereof forms a true circle as the running surface of the wheel and furthermore such outer surface or tread may be roughened or formed with grooves, channels, ridges, projections, studs or otherwise formed (if required) of an anti-slipping or non-skidding or other desired character.

The india-rubber cushion or continuous ring of rubber 4 whether formed in one or more pieces may if desired be of arched formation or any other desired form in cross-section and sufficient room is left or allowed inside the cushion chamber (formed between the rim 1ª and the interior of the shoe sections 5) to allow said rubber to be compressed or extended in any desired direction or directions.

11 is a loose band of suitable flexible material (e. g. leather or canvas etc.) which is laid in between the insertion pieces 12 and the rubber tire 4; or this band 11 may be dispensed with if desired.

In order to prevent creeping either of the ring of shoe sections 5 with respect to the rubber 4 or wheel rim 1ª and also to prevent creeping of the rubber 4 with respect to the wheel rim 1ª or shoe sections 5—I advantageously form the cushion of rubber 4 on its outer periphery with a series of concavities 4ª Fig. 1 (or other depressions) arranged equally all round the periphery (or at any suitable point or points thereon) adapted to receive insertion pieces 12 12 of any suitable material (for example metal) formed on the underside as a counterpart of said concavity or depression 4ª in the rubber cushion 4 and the said insertion pieces 12 are laid in between said parts of the periphery of the rubber cushion 4 and the flat wire rope 9 between the cushion periphery and the shoes.

When pneumatic tires are used the external cover of the air tube must be so arranged, or other means so provided, that the said air tube cover is not destroyed or injured by the movements of the shoes.

Referring now to Figs. 4 and 5:—The elastic cushion 4 which is shown as an endless band of rubber in each of the tracks of the twin track wheel is provided with a series of metal shoes 5 which form the protecting cover for each said elastic cushion 4 and also form the actual wearing surface which makes contact with the ground; each said shoe 5 being secured as aforesaid, for example by the rivets 10 to the flat wire rope 9 which is advantageously an endless flat wire rope manufactured in the form of a complete ring, and also the shoes are advantageously riveted through the flat wire-rope 9 to the insertion pieces 12 which latter fit in the concavities 4ª formed in the periphery of the rubber band 4 and serve as "feathers" to prevent creeping of the protective cover with respect to said rubber band 4. A band 11 of suitable flexible material as before described may (if desired) be laid in between the insertion pieces 12 and the rubber tire 4. If desired a screw 13 may be passed through each side flange of each metal shoe 5 into the insertion piece 12 as shown in Figs. 4 and 5.

What I claim is:—

1. A protecting cover for resilient tires of wheels of road vehicles comprising an endless flexible band around the periphery of said resilient tire, a series of concavities in the periphery of the resilient tire, insertion pieces fitting in said concavities and located between said band and the resilient tire all round the latter to prevent creep, a series of protecting shoes of channel shape in cross-section, and means to secure said shoes to the said band and insertion pieces—to thereby hold said shoes spaced apart in position over the said resilient tire and a band of flexible material such as leather or canvas located between the said insertion pieces and said resilient tire substantially as described.

2. A protecting cover for resilient tires of wheels of road vehicles comprising an endless flexible metal band around the periphery of said resilient tire, a series of concavities in the periphery of the resilient tire, insertion pieces fitting in said concavities and located between said band, and the resilient tire all round the latter to prevent creep, a series of protecting shoes of channel shape in cross-section, and means to secure said shoes to the said band and insertion pieces—to thereby hold said shoes spaced apart in position over the said resilient tire, and a band of flexible material such as leather or canvas located between the said insertion pieces and said resilient tire substantially as described.

3. A protecting cover for resilient tires of wheels of road vehicles comprising an endless wire rope around the periphery of said resilient tire, a series of concavities in the periphery of the resilient tire, insertion pieces fitting in said concavities and located between said rope and the resilient tire all round the latter to prevent creep, a series of protecting shoes of channel shape in cross-section, and means to secure said shoes to the said rope and insertion pieces—to thereby hold said shoes spaced-apart in position over the said resilient tire, and a band of flexible material such as leather or canvas located between the said insertion pieces and said resilient tire substantially as described.

4. A protecting cover for resilient tires of wheels of road vehicles comprising a ring of flat wire rope around the periphery of said resilient tire, a series of concavities in the periphery of the resilient tire, insertion pieces fitting in said concavities and located between said rope and the resilient tire all round the latter to prevent creep, a series of protecting shoes of channel shape in cross-section, and means to secure said shoes to the said rope and insertion pieces—to thereby hold said shoes spaced apart in position over the said resilient tire, and a band of flexible material such as leather or canvas located between the said insertion pieces and said resilient tire substantially as described.

5. A protecting cover for resilient tires of wheels of road vehicles; comprising an endless metal band around the periphery of said resilient tire, a series of protecting shoes of channel shape in cross section secured to said band, and means to flexibly connect the flanges of the shoes, substantially as described.

6. A protecting cover for resilient tires of wheels of road vehicles; comprising an endless metal band around the periphery of said resilient tire, a series of protecting shoes of channel shape in cross-section secured to said band, insertion pieces located between said band and the resilient tire all round the latter to prevent creep of said band and shoes thereon, and means to flexibly connect the flanges of the shoes, substantially as described.

7. A protecting cover for resilient tires of wheels of road vehicles; comprising an endless metal band around the periphery of said resilient tire, a series of protecting shoes of channel shape in cross-section secured to said band, a series of concavities in the periphery of the resilient tire, insertion pieces fitting in said concavities and located between the said band and the resilient tire all round the latter to prevent creep of said band and shoes thereon, and means to flexibly connect the flanges of the shoes, substantially as described.

8. A protecting cover for resilient tires of wheels of road vehicles; comprising an endless metal band around the periphery of said resilient tire, a series of protecting shoes of channel shape in cross-section secured to said band, a series of concavities in the periphery of the resilient tire, insertion pieces fitting in said concavities and located between the said band and the resilient tire all round the latter to prevent creep of said band and shoes thereon, a band of flexible material such as leather or canvas located between the said insertion pieces and said resilient tire, and means to flexibly connect the flanges of the shoes, substantially as described.

In witness whereof I have hereunto set my hand in presence of two witnesses.

JAMES STEVENS.

Witnesses:
H. D. JAMESON,
C. P. LIDDON.